United States Patent
Makino (10) Patent No.: US 10,768,129 B2
(45) Date of Patent: Sep. 8, 2020

(54) SURFACE CHARACTERISTICS EVALUATION METHOD FOR STEEL MATERIAL

(71) Applicant: SINTOKOGIO, LTD., Nagoya-shi, Aichi (JP)

(72) Inventor: Yoshiyasu Makino, Okazaki (JP)

(73) Assignee: SINTOKOGIO, LTD., Aichi (JP)

( * ) Notice: Subject to any disclaimer, the term of this patent is extended or adjusted under 35 U.S.C. 154(b) by 171 days.

(21) Appl. No.: 15/737,981

(22) PCT Filed: Jun. 7, 2016

(86) PCT No.: PCT/JP2016/066922
§ 371 (c)(1),
(2) Date: Dec. 19, 2017

(87) PCT Pub. No.: WO2017/081879
PCT Pub. Date: May 18, 2017

(65) Prior Publication Data
US 2018/0299393 A1 Oct. 18, 2018

(30) Foreign Application Priority Data
Nov. 9, 2015 (JP) .................................. 2015-219022

(51) Int. Cl.
*G01N 27/02* (2006.01)
*G01N 27/72* (2006.01)
(Continued)

(52) U.S. Cl.
CPC ........... *G01N 27/023* (2013.01); *G01N 27/02* (2013.01); *G01N 27/025* (2013.01); *G01N 27/72* (2013.01);
(Continued)

(58) Field of Classification Search
CPC ........ G01N 27/02; G01N 27/72; G01N 27/90; G01N 27/24
See application file for complete search history.

(56) References Cited

U.S. PATENT DOCUMENTS

| 4,528,856 A * | 7/1985 | Junker ..................... G01B 7/24 |
| | | 324/209 |
| 2008/0001609 A1 | 1/2008 | Kojima et al. |

(Continued)

FOREIGN PATENT DOCUMENTS

| EP | 0618445 A2 | 10/1994 |
| EP | 2707705 A1 | 3/2014 |

(Continued)

OTHER PUBLICATIONS

Anonymous, "Eddy current—Wikipedia, the 4 free encyclopedia", Jul. 14, 2014, Retrieved from the Internet at URL: <https://web.archive.org/web/20140714030558/https://en.wikipedia.org/wiki/Eddy_current> retrieved on Nov. 8, 2018, 10 pages.

(Continued)

*Primary Examiner* — Herbert K Roberts
(74) *Attorney, Agent, or Firm* — Brinks Gilson & Lione (57) ABSTRACT

To provide a surface characteristics evaluation method that evaluates the residual stress in a subject made of steel material subjected to a surface modification treatment. A surface characteristics evaluation method includes a step of preparing a surface characteristics evaluation apparatus, a step of placing the subject in such a manner that an alternating magnetic field induced by a coil of the surface characteristics evaluation apparatus permeates into the steel material, a step of generating an eddy current in the subject, a step of successively changing the alternating magnetic field applied to the coil, a step of calculating the impedance Z1 for each of different frequencies from the potential difference across the coil and the value of the current flowing through the coil, a step of performing computation based on the impedance Z1, and a step of evaluating the residual stress in the steel material based on the computation result.

5 Claims, 4 Drawing Sheets

(51) Int. Cl.
*G01N 27/90* (2006.01)
*G01N 27/80* (2006.01)
*G01N 27/82* (2006.01)
*C21D 7/04* (2006.01)
*C21D 7/06* (2006.01)

(52) U.S. Cl.
CPC ......... *G01N 27/80* (2013.01); *G01N 27/9046* (2013.01); *C21D 7/06* (2013.01); *G01N 27/82* (2013.01); *G01N 27/90* (2013.01)

(56) References Cited

U.S. PATENT DOCUMENTS

| 2014/0084910 A1* | 3/2014 | Makino | G01B 7/105 |
| | | | 324/240 |
| 2015/0083918 A1* | 3/2015 | Emmenegger | G01M 3/226 |
| | | | 250/341.1 |

FOREIGN PATENT DOCUMENTS

| JP | H05-203503 A | 8/1993 |
| JP | H07-092140 A | 4/1995 |
| JP | 2007-040865 A | 2/2007 |
| JP | 2008-002973 A | 1/2008 |
| JP | 2011-185623 A | 9/2011 |
| WO | WO 2012/153862 A1 | 11/2012 |

OTHER PUBLICATIONS

Extended European Search Report for Europe Application No. 16863843.5, dated Nov. 22, 2018, pp. 1-25.
International Search Report in corresponding International Application No. PCT/JP2016/066922, dated Aug. 16, 2016, 5 pages.

* cited by examiner

SURFACE CHARACTERISTICS EVALUATION METHOD FOR STEEL MATERIAL

This application is a 371 application of PCT/JP2016/066922 having an international filing date of Jun. 7, 2016, which claims priority to JP2015-219022 filed Nov. 9, 2015, the entire contents of which are incorporated herein by reference.

TECHNICAL FIELD

The present invention relates to a method of evaluating a residual stress in a steel material subjected to a surface modification treatment.

BACKGROUND ART

Widely known surface modification treatments for a steel material include various heat treatments (carburization, nitriding heat treatment and induction hardening, for example) and a shot peening treatment. The surface modification treatment imparts a residual stress in the vicinity of the surface of the steel material to improve the fatigue strength of the steel material. The conditions of the surface modification treatment are determined so as to achieve a desired residual stress in the depth direction from the surface of the steel material depending on the use of the steel material. To precisely evaluate whether the surface modification treatment has been properly performed or not, the distribution of the residual stress in the depth direction needs to be considered.

A method of measuring the fatigue strength of a steel material is disclosed in Patent Literature 1. In Patent Literature 1, the depth at which a predetermined compressive residual stress in a steel material subjected to shot peening reaches a peak value is evaluated. However, according to the evaluation method disclosed in Patent Literature 1, the measurement condition needs to be set for each measurement target or each condition of the surface modification treatment is changed. Thus, due to the individual difference between the materials or other variations, the evaluation cannot be performed with high precision.

Another method of measuring the fatigue strength of a steel material is disclosed in Patent Literature 2. In Patent Literature 2, the distribution of the compressive residual stress in the steel material is calculated by successively measuring the value of the output voltage of the detecting coil while successively changing the depth of permeation (magnetic permeability) of the magnetic flux in the surface of the steel material by successively changing the frequency of the exciting current passed through the exciting coil that abuts against the steel material. However, the value of the output value of the detecting coil includes the voltage component due to the variation of the magnetic permeability and the voltage component due to the impedance of the detecting coil itself. Therefore, if the characteristics of the impedance of the detecting coil itself varies due to variations of the environment (temperature, noise or the like), the reliability of the measurement value decreases. In addition, the exciting coil of this measuring apparatus needs to be designed by considering the phenomenon (lift off effect) where the detected signal varies with the distance from the steel material. However, the disclosure contains no mention with regard to this phenomenon. Thus, the measuring apparatus disclosed in Patent Literature 2 cannot accurately evaluate the compressive residual stress in the steel material.

CITATION LIST

Patent Literature

Patent Literature 1
Japanese Patent Laid-Open No. 07-092140
Patent Literature 2
Japanese Patent Laid-Open No. 05-203503

SUMMARY OF THE INVENTION

Technical Problem

In view of the circumstances described above, an object of the present invention is to provide a surface characteristics evaluation method that can precisely evaluate a residual stress in a steel material subjected to a surface modification treatment by considering the distribution of the residual stress in the depth direction.

Solution to the Problem

An aspect of the present invention is a surface characteristics evaluation method of evaluating a residual stress in a subject made of a steel material subjected to a surface modification treatment. The surface characteristics evaluation method includes the following steps (1) to (6). The steps may be separately performed, or two or more of the steps may be performed at the same time.

(1) A preparation step of preparing a surface characteristics evaluation apparatus that includes an oscillator including an AC power supply and a frequency changing circuit, a detector including a coil and connected to the oscillator, and a measuring instrument connected to the frequency changing circuit and the detector.

(2) A subject placement step of placing the steel material subjected to the surface modification treatment in such a manner that an alternating magnetic field induced by the coil permeates into the subject.

(3) An eddy current generation step of generating an eddy current in the subject by activating the AC power supply to make the coil induce the alternating magnetic field and allow the alternating magnetic field to permeate into the subject.

(4) A frequency change step of successively changing the frequency of the alternating current by the frequency changing circuit, thereby successively changing the depth of permeation of the alternating magnetic field into the subject.

(5) An impedance calculation step of calculating an impedance $Z_1$ for each of different frequencies by detecting a potential difference between opposite ends of the coil and the value of a current flowing through the coil.

(6) An evaluation step of evaluating the residual stress in the subject based on the impedance $Z_1$.

According to the aspect, a strain that occurs in the steel material due to the surface modification treatment is detected by allowing the alternating magnetic field induced by the coil to permeate into the steel material. In this process, the frequency of the alternating current applied to the coil is successively changed, so that the distribution of the strain in the depth direction can be detected. In addition, by using the impedance $Z_1$, a signal corresponding to the impedance of the coil and the S/N ratio (S: evaluating voltage, N: noise that is not from the evaluating voltage) can be increased, so that the evaluation precision can be improved. Thus, the residual stress in the steel material subjected to the surface modification treatment can be precisely evaluated by considering the distribution thereof in the depth direction.

According to an embodiment, the method may further include a reference impedance measurement step of preliminary measuring in advance a reference impedance $Z_0$ at each of the different frequencies for the subject yet to be subjected to the surface modification treatment. In the evaluation step, an impedance ratio between the reference impedance $Z_0$ and the impedance $Z_1$ may be computed for each of the different frequencies, and the residual stress in the subject subjected to the surface modification treatment may be evaluated based on the set of computed values. Since the evaluation is made based on the impedance ratio between the impedances measured for the subject yet to be subjected to the surface modification treatment and the subject subjected to the surface modification treatment respectively, the voltage drift due to variations of the ambient temperature and humidity can be reduced. In addition, variations of the electromagnetic characteristics caused by the surface modification treatment can be selectively extracted. Thus, the evaluation of the residual stress in the steel material subjected to the surface modification treatment can be precisely performed by considering the distribution thereof in the depth direction.

According to an embodiment, in the evaluation step, an inductive reactance $X_1$ may be calculated for each of the frequencies from the impedance $Z_1$, and the residual stress in the steel material subjected to the surface modification treatment may be evaluated based on the inductive reactance $X_1$. Since the inductive reactance, which is the Y-axis component of the impedance (imaginary part of the complex impedance), is calculated, and the evaluation is made based on the inductive reactance, the magnetic permeability of the subject can be selectively evaluated. As a result, the evaluation precision is improved.

According to an embodiment, the frequency of the alternating current may be converted into the depth of permeation of the alternating magnetic field according to the following equation, and the distribution of the residual stress in the subject subjected to the surface modification treatment in the depth direction may be evaluated based on the converted depth of permeation. The distribution of the strain in the depth direction can be precisely grasped and evaluated.

$$y = \kappa \frac{1}{\sqrt{\pi x \mu \sigma}}$$

y: depth of permeation of alternating magnetic field (μm)
k: correction coefficient
x: frequency of alternating current (Hz)
μ: magnetic permeability of steel material (H/m)
σ: electric conductivity of steel material (S/m)

According to an embodiment, the set of computed values (impedance ratios) may be plotted on a coordinate system having the following coordinate axes A and B. The distribution of the strain in the steel material caused by the surface modification treatment can be visually grasped.

Coordinate axis A indicates impedance ratio between the reference impedance $Z_0$ measured for the subject yet to be subjected to the surface modification treatment and the impedance $Z_1$ measured for the subject subjected to the surface modification treatment.

Coordinate axis B indicates frequency.

According to an embodiment, in the step of evaluating the residual stress, the residual stress in the subject subjected to the surface treatment may be evaluated based on a trajectory of a graph of the set of computed impedance ratios plotted on the coordinate system having the coordinate axes A and B and one or more of the impedance ratios including an extreme of the trajectory. The evaluation of the residual stress can be made based on both the way in which the strain caused by the surface modification treatment is distributed in the subject and the impedance ratio at the depth of which the strain reaches the extreme.

According to an embodiment, in the evaluation step, the quality of the surface modification treatment may be determined by comparing one or more of the computed impedance ratios including the extreme with one or more preset thresholds. Whether the surface modification treatment has been properly performed or not can be determined by considering the distribution in the depth direction.

Advantageous Effect of the Invention

According to the aspect and the embodiments, a surface characteristics evaluation method that can precisely evaluate a residual stress in a steel material subjected to a surface modification treatment by considering the distribution of the residual stress in the depth direction can be provided. Thus, the degree of the surface modification treatment performed on the steel material can be precisely evaluated by considering the distribution thereof in the depth direction.

DETAILED DESCRIPTION OF THE EMBODIMENTS

An embodiment of the present invention will be described with reference to the drawings. In the following description, the upward, downward, leftward and rightward directions indicate the respective directions in the drawings unless otherwise specified.

(Surface Characteristics Evaluation Apparatus)

A surface characteristics evaluation apparatus 1 according to an embodiment includes an oscillator 10, a detector 20, and a measuring instrument 30.

The oscillator 10 includes an AC power supply 11 and a frequency changing circuit 12. The frequency changing circuit 12 is connected to the AC power supply 11 and can change the frequency of the alternating current output from the AC power supply 11.

Figure 1:
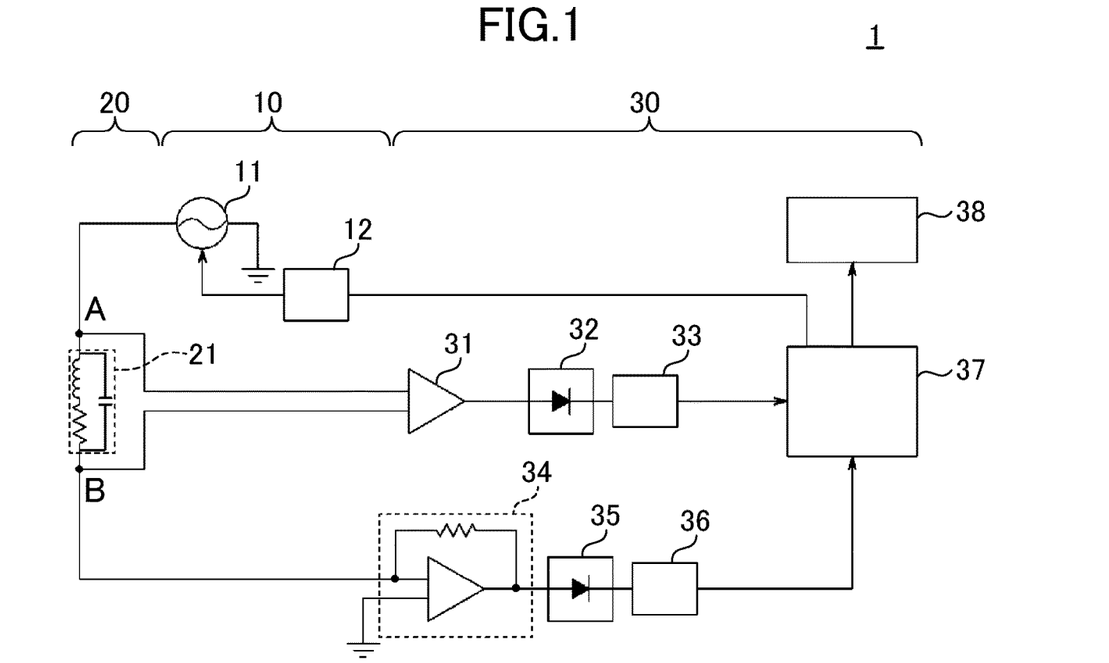
FIG. 1 is a circuit diagram for illustrating an embodiment of the present invention.

The detector 20 includes a coil 21. The coil 21 is connected to the AC power supply 11 at one end (point A) thereof and supplied with an alternating current output from the AC power supply 11. The circuit diagram symbol in the dashed line box surrounding the coil 21 in FIG. 1 represents an electrically equivalent circuit of the coil 21.

The measuring instrument 30 includes an amplification circuit 31, an absolute value circuit 32, a low pass filter (LPF) 33, an I/V conversion circuit 34, an absolute value circuit 35, an LPF 36, control means 37, and a display unit 38. In addition, the measuring instrument 30 includes storage means in the control means 37 or in a section not shown. More specifically, the control means 37 may be constituted by a microprocessor, an interface circuit, a memory and a program that makes these components operate (all of which are not shown in the drawing), for example.

The amplification circuit 31 is connected to points A and B, which are opposite ends of the coil 21. A signal indicating the potential difference between the points A and B is input to the amplification circuit 31 and amplified. The amplified signal is full-wave rectified by the absolute value circuit 32, and the resulting signal is converted into a direct current by the LPF 33. The converted signal is input to the control means 37.

The I/V conversion circuit 34 is connected to the other end (point B) of the coil 21. A signal indicating the value of a current flowing through the coil 21 is input to the I/V conversion circuit 34 and converted into a signal indicating a potential difference. The signal is full-wave rectified by the absolute value circuit 35, and the resulting signal is converted into a direct current by the LPF 36. The converted signal is input to the control means 37.

The control means 37 is connected to the frequency changing circuit 12 and the LPFs 33 and 36 and receives a signal indicating the frequency of the alternating current applied to the coil 21 and the signals having passed through the LPFs 33 and 36 at the frequency. Based on these input signals, the control means 37 performs a computation and evaluates the surface characteristics of a subject based on the computation result. The frequency of the alternating current may be manually changed, or automatically changed if the control means 37 has a function of outputting a signal to successively change the frequency to the frequency changing circuit 12. This embodiment is the latter case.

The display unit 38 displays the result of the evaluation by the control means 37 or a warning about the evaluation result.

(Evaluation Method)

Next, a method of evaluating the surface characteristics of the subject using the surface characteristics evaluation apparatus 1 according to this embodiment will be described. In the following, a case will be described where the shot peening treatment (referred to as an SP treatment, hereinafter) is selected as the surface modification treatment, and a compressive residual stress in a steel material subjected to the SP treatment is evaluated as the degree of the surface modification treatment.

S01: Preparation Step

The surface characteristics evaluation apparatus 1 and a steel material yet to be subjected to the SP treatment (a subject yet to be treated) are prepared. In this embodiment, a piece of chromium molybdenum steel (SCM420H defined in JIS G4053) having a diameter of 40 mm and a length of 30 mm carburized is prepared.

S02: First Placement Step (for the Subject Yet to be Treated)

The subject yet to be treated as the subject is placed in the detector 20. The way in which the subject is placed is not particularly limited as far as the alternating magnetic field induced around the coil 21 in the subsequent step is allowed to permeate into the subject. In this embodiment, the subject yet to be treated is placed inside the coil 21 at the center of the circular cross section of the coil 21 in such a manner that the whole of the subject yet to be treated is inside the coil 21. By placing the subject in this manner, variations in the direction perpendicular to the depth direction of the subject due to the material thereof can be reduced, and therefore, the measurement precision can be improved.

S03: Measurement Step for Subject Yet to be Treated (Reference Impedance Measurement Step)

Figure 2:
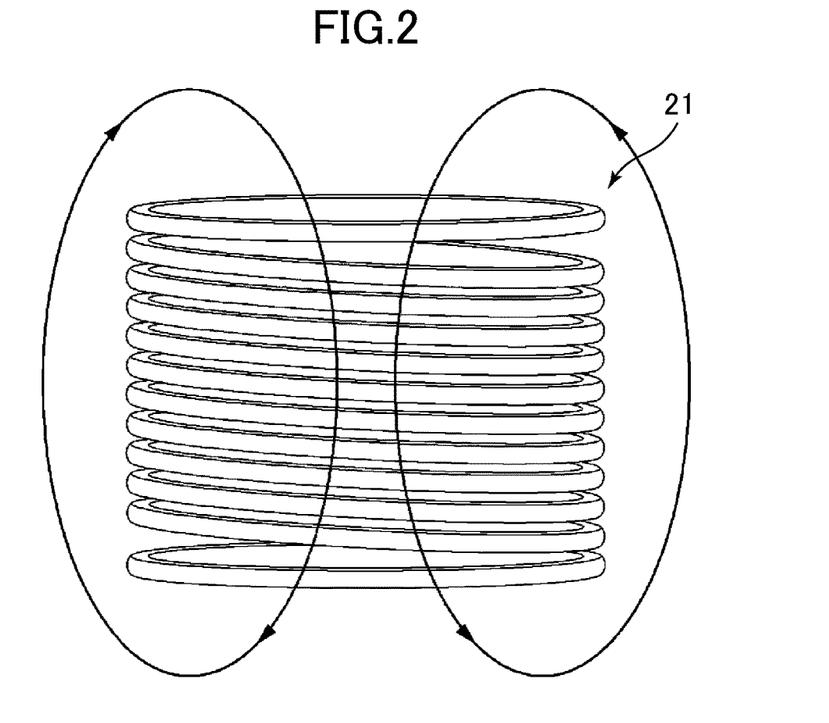
FIG. 2 is a schematic diagram for illustrating an eddy current generated around a coil according to the embodiment of the present invention.

In a first eddy current generation step, the control means 37 outputs a signal to control the frequency of the alternating current output from the AC (alternating-current) power supply 11 to the frequency changing circuit 12, and the AC power supply 11 is activated. Upon activation of the AC power supply 11, an alternating magnetic field is induced around the coil 21 (see FIG. 2). Since the subject is placed inside the coil 21, the alternating magnetic field permeates into the subject. The permeating alternating magnetic field causes an eddy current in the surface of the subject. The eddy current induces an opposing magnetic field against the alternating magnetic field. The magnetic permeability varies with the magnitude of the residual stress. Thus, the magnitude of the total magnetic flux of the opposing magnetic field and the alternating magnetic field varies with the magnitude of the residual stress, which indicates the degree of the surface modification treatment. That is, depending on the magnitude of the residual stress, signals indicating the electric characteristics of the coil through which the alternating current is flowing (the signal indicating the potential difference across the coil (between the points A and B) and the signal indicating the value of the current having passed through the coil) vary. From the signal having passed through the amplification circuit 31, the absolute value circuit 32 and the LPF 33 to be input in the control means 37 and the signal having passed through the I/V conversion circuit 34, the absolute value circuit 35 and the LPF 36 to be input in the control means 37, the control means 37 calculates an impedance $Z_0$ at the frequency.

In addition, the depth to which the alternating magnetic field permeates into the subject depends on the frequency of the alternating current. In view of this, in a first frequency change step, the control means 37 changes the frequency of the alternating current output from the AC power supply 11. In a first detection step, while changing the frequency of the alternating current, the signals indicating the electrical characteristics of the alternating current at different frequencies are detected, and the impedance $Z_0$ of the coil 21 is calculated from these signals and stored in the storage means.

S04: Surface Modification Treatment Step

The subject yet to be treated is removed from the detector 20, and the compressive residual stress is imparted to the subject in the SP treatment to provide the steel material subjected to the surface modification treatment (surface-modified subject).

S05: Measurement Step for Surface-Modified Subject

In a second subject placement step, the steel material (surface-modified subject) subjected to the surface modification treatment in the step S04 is placed in the detector 20. Then, a second eddy current generation step, a second frequency change step and a second detection step similar to the first eddy current generation step, the first frequency change step and the first detection step performed in the step S03, respectively, are performed, and an impedance $Z_1$ of the coil at different frequencies is calculated. The frequencies used in the step S05 are the same as those used in the step S03. Since the opposing magnetic field described above varies with the magnitude of the compressive residual stress that indicates the degree of the surface modification treatment, the degree of the surface modification treatment of the subject can be evaluated by evaluating the electric characteristics of the alternating current flowing through the coil.

S06: Determination Step (Evaluation Step)

The control means 37 computes the ratio $(Z_1/Z_0)$ of the impedance $Z_1$ to the impedance $Z_0$ for each of the different frequencies to obtain a set of computed values. By using the impedance ratio $(Z_1/Z_0)$ for evaluation of the surface characteristics, the voltage drift due to variations of the measurement environment (temperature, humidity or the like) can be reduced. In addition, since variations of the electromagnetic characteristics of the subject caused by the surface modification treatment can be selectively extracted, the precision of the evaluation of the surface characteristics is improved.

A graph (coordinate system) that indicates impedance ratio $(Z_1/Z_0)$ on the vertical axis and frequency on the horizontal axis is prepared, and points corresponding to the set of computed values indicating the impedance ratio $(Z_1/Z_0)$ calculated for each of the different frequencies are plotted on the graph. The frequency corresponds to the depth from the surface of the subject, so that the distribution of the compressive residual stress in the depth direction, which indicates the degree of the surface modification treatment, can be visually grasped from the trajectory on the graph.

The horizontal axis may indicate depth from the surface of the steel material, which can be calculated from the frequency. The relationship between the frequency and the depth from the surface of the steel material can be calculated from a calibration curve showing a relationship between the frequency and the depth from the surface of the steel material, which is created according to the following formula 1. In the formula 1, the correction coefficient k is a value that varies with the shape of the subject (the volume of the subject, for example), the properties of the subject (whether or not a heat treatment has been performed on the subject in advance, for example), or the conditions of the SP treatment (the diameter or hardness of the particles shot or the injection duration or injection pressure of the particles, for example), for example. The correction coefficient k is experimentally calculated in advance.

$$y = \kappa \frac{1}{\sqrt{\pi \chi \mu \sigma}} \quad \text{[formula 2]}$$

y: depth of permeation of alternating magnetic field (μm)
k: correction coefficient
x: frequency of alternating current (Hz)
μ: magnetic permeability of steel material (H/m)
σ: electric conductivity of steel material (S/m)

From the distribution obtained, the control means 37 determines the quality of the surface modification treatment. Determination processes will be illustrated in the following. However, the present invention is not limited to these processes.

A set of thresholds and an allowable range for determining whether the SP treatment has been properly performed or not are calculated in advance. A plurality of pieces of the steel material on which the SP treatment has been properly performed (conforming items) and a plurality of pieces of the steel material on which the SP treatment has been improperly performed (defective items) are measured in the steps S01 to S04 described above, and the set of thresholds of the impedance ratio and the frequency or depth from the surface of the steel material associated with the impedance ratio and the allowable range thereof are determined based on the measurement.

The set of thresholds are compared with the set of computed values. For example, several (six, for example) frequencies including the frequency at which the trajectory of the graph of the set of computed values, that is, the calculated values of the impedance ratio, reaches an extreme and frequencies in the vicinity thereof are selected, and the values of the impedance ratio at the selected frequencies are compared with the respective thresholds. If all the values compared fall within the allowable ranges of the respective thresholds, it is determined that the SP treatment has been properly performed. If any of the values does not fall within the allowable range of the threshold, it is determined that the SP treatment has been improperly performed.

Another determination method involves determination of whether the graph indicating the set of computed values (the graph indicating the relationship between the frequency or depth from the surface of the steel material and the impedance ratio) falls within an allowable range of a counterpart graph indicating the set of thresholds, and determination of whether an extreme of the graph of the impedance ratio falls within an allowable range of an extreme of the set of thresholds. If both fall within the allowable range of the set of thresholds, it is determined that the SP treatment has been properly performed. If either does not fall within the allowable range of the set of thresholds, it is determined that the SP treatment is improperly performed.

S07: Output Step

The result of the determination of the quality of the surface modification treatment is output on the display unit 38. The display unit 38 may simply display the determination result or may additionally give an alarm when it is determined that the quality of the surface modification treatment is bad. Alternatively, the display unit 38 may display the graph described above (the graph showing the relationship between the frequency (of depth from the surface of the steel material) and the impedance ratio).

By the steps described above, the degree of the surface modification treatment can be evaluated by considering the distribution thereof in the depth direction from the surface of the subject.

In the following, a result of evaluation of the surface characteristics of a steel material using the surface characteristics evaluation apparatus 1 according to this embodiment will be described.

The shot peening treatment was performed on the piece of chromium molybdenum steel (having a diameter of 40 mm and a length of 30 mm) carburized described above under the conditions that particles having average diameters ranging from 50 μm to 1000 μm (all available from SHINTOKOGIO, LTD) were shot by a shot peening machine (available from SHINTOKOGIO, LTD) at an injection pressure of 0.3 MPa over a coverage of 300% (see Table 1). The pieces of chromium molybdenum steel subjected to the shot peening treatment were used as subjects.

TABLE 1

|  | Diameter of particles shot (μm) | Injection pressure (MPa) | Coverage (%) |
|---|---|---|---|
| Subject A | 50 | 0.3 | 300 |
| Subject B | 300 | 0.3 | 300 |
| Subject C | 600 | 0.3 | 300 |

The frequency (operating frequency) of the alternating current was set to range from 10 kHz to 20 MHz. From the calibration curve, the depth of permeation of the alternating magnetic field was calculated from the operating frequency.

Figure 4:
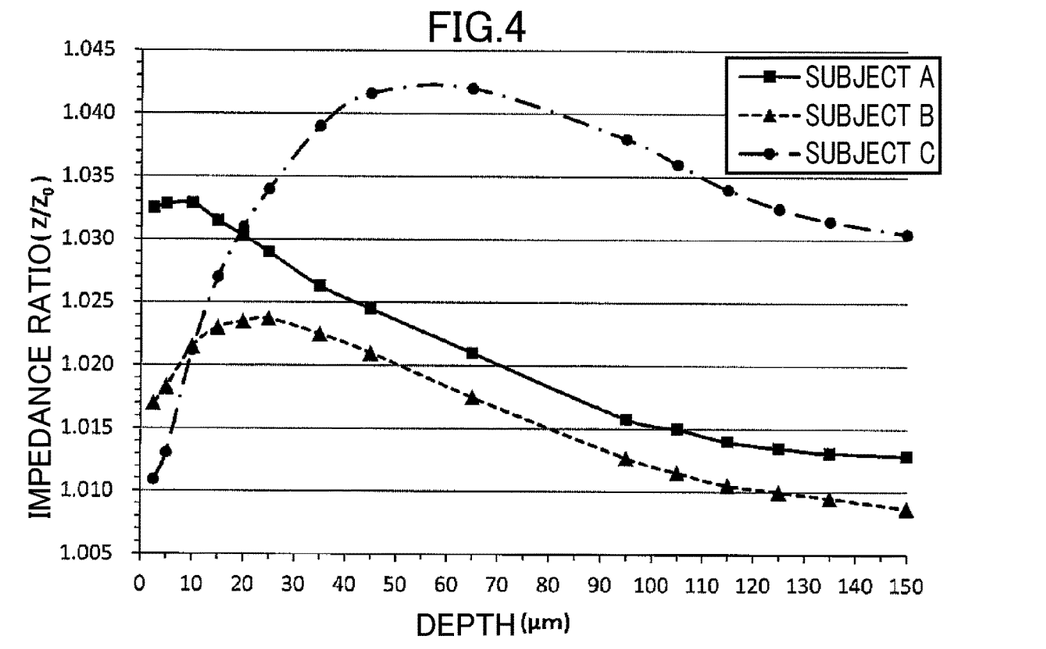
FIG. 4 is a graph for illustrating examples in the embodiment of the present invention.

The result is shown in FIG. 4. As can be seen from FIG. 4, the depth at which the trajectory of the impedance ratio $(Z_1/Z_0)$ reaches an extreme is in the vicinity of 10 μm for the subject A, in the vicinity of 25 μm for the subject B, and in the vicinity of 55 μm for the subject C.

Figure 5:
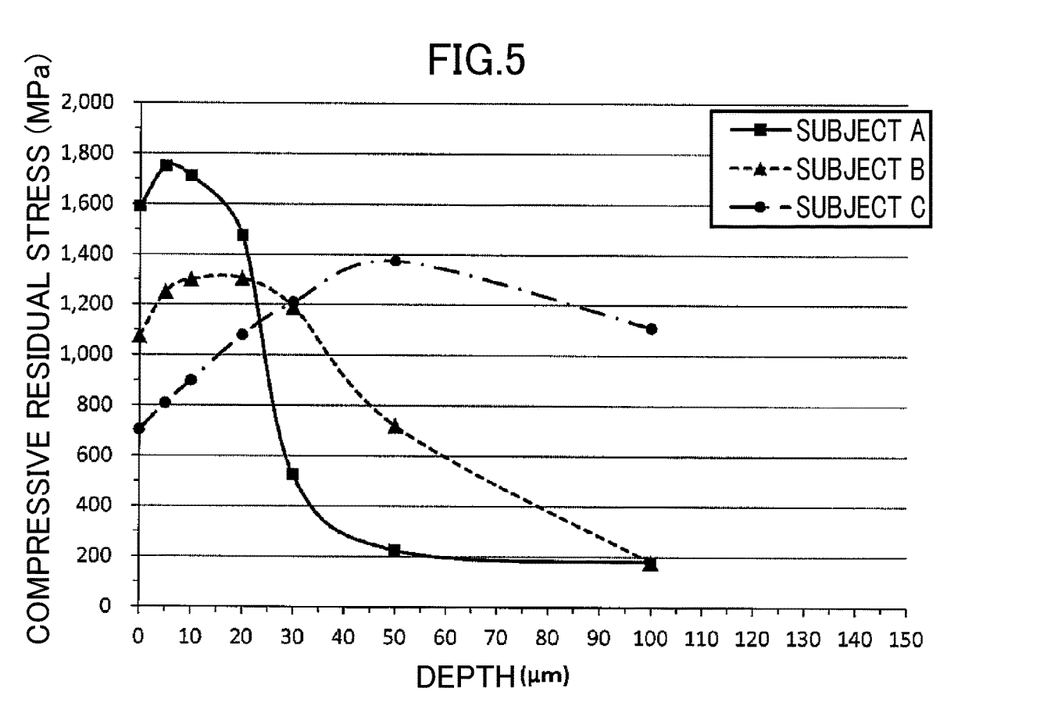
FIG. 5 is a graph showing the residual stress in a steel material used in the example in the embodiment of the present invention.

FIG. 5 shows a result of measurement of the compressive residual stress in the subjects A to C by an X-ray stress measuring device. As can be seen from FIG. 5, the depth at which the trajectory of the compressive residual stress reaches an extreme is in the vicinity of 5 to 10 μm for the subject A, in the vicinity of 20 μm for the subject B, and in the vicinity of 50 μm for the subject C. The depths at which the trajectory reaches an extreme shown in FIGS. 4 and 5 are generally correlated, and this suggests that the surface characteristics evaluation apparatus and the surface characteristics evaluation method according to the present invention can evaluate the degree of the surface modification treatment by considering the distribution in the depth direction.

(Modification 1)

Figure 6:
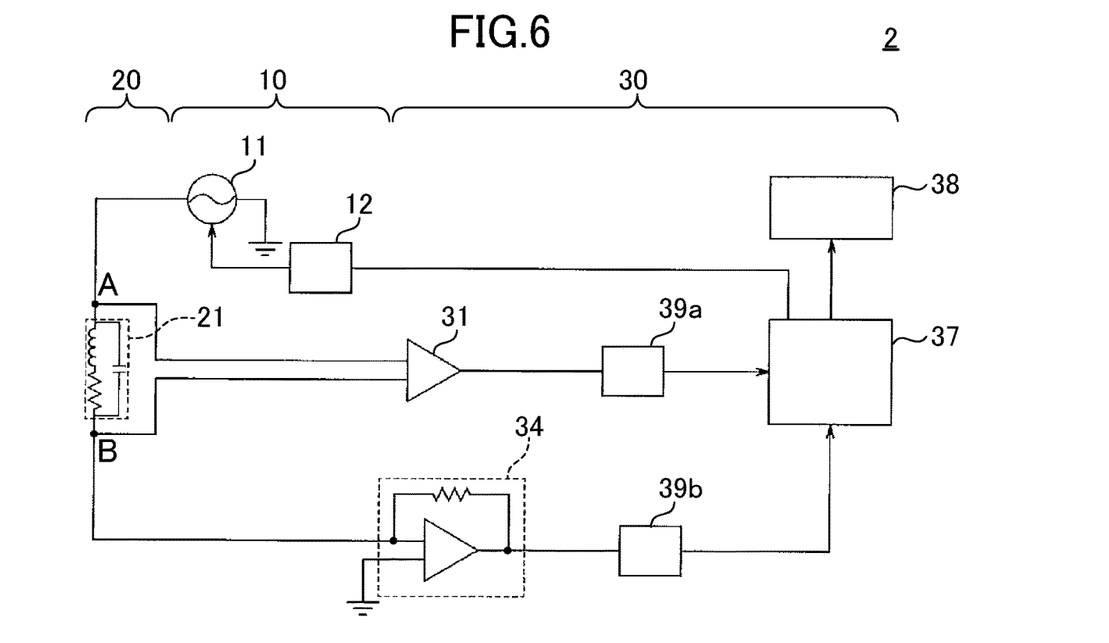
FIG. 6 is a circuit diagram for illustrating another embodiment (modification 1) of the present invention.

FIG. 6 shows a surface characteristics evaluation apparatus 2 according to another embodiment. A measuring instrument 30 of the surface characteristics evaluation apparatus 2 according to this embodiment includes the amplification circuit 31, an A/D conversion circuit 39a, the I/V conversion circuit 34, an A/D conversion circuit 39b, the control means 37, and the display unit 38. In addition, the control means 37 incorporates storage means 37a. The storage means 37a may be provided outside the control means 37. The oscillator 10 and the detector 20 are configured in the same way as those in the embodiment described earlier, so that descriptions thereof will be omitted, and the following description will be focused on the differences from the embodiment described earlier.

The amplification circuit 31 is connected to the points A and B, which are opposite ends of the coil 21. The signal indicating the potential difference between the points A and B is input to the amplification circuit 31 and amplified. The amplified signal is converted from an analog voltage signal into a digital signal by the A/D conversion circuit 39a. The converted digital signal is input to the control means 37.

The I/V conversion circuit 34 is connected to one end (point B) of the coil 21. The signal indicating the value of the current flowing through the coil 21 is input to the I/V conversion circuit 34 and converted into an analog voltage signal. The analog voltage signal output from the I/V conversion circuit 34 is converted into a digital signal by the A/D conversion circuit 39b, and the resulting signal is input to the control means 37.

The control means 37 processes the digital signals respectively received from the A/D conversion circuits 39a and 39b by a digital signal processing. More specifically, each of the digital signals received from the amplification circuit 31 and the I/V conversion circuit 34 is a time-series signal that varies in an alternating current-like manner, and is converted into a direct current-like digital signal by a digital computation equivalent to the absolute value circuit 32, 35 and the LPF 33, 36 (see FIG. 1) in the embodiment described earlier. Thus, the alternating-current analog voltage signal input to each of the A/D conversion circuits 39a and 39b is converted in the control means 37 into a digital value proportional to the amplitude of the alternating-current signal. The impedance is calculated based on these digital values.

The surface characteristics evaluation apparatus 2 according to this embodiment uses a digital signal processing for signal computation and therefore is less susceptible to noise. Thus, even in an environment where noise is likely to occur, the evaluation can be made with higher precision.

(Modification 2)

Figure 7:
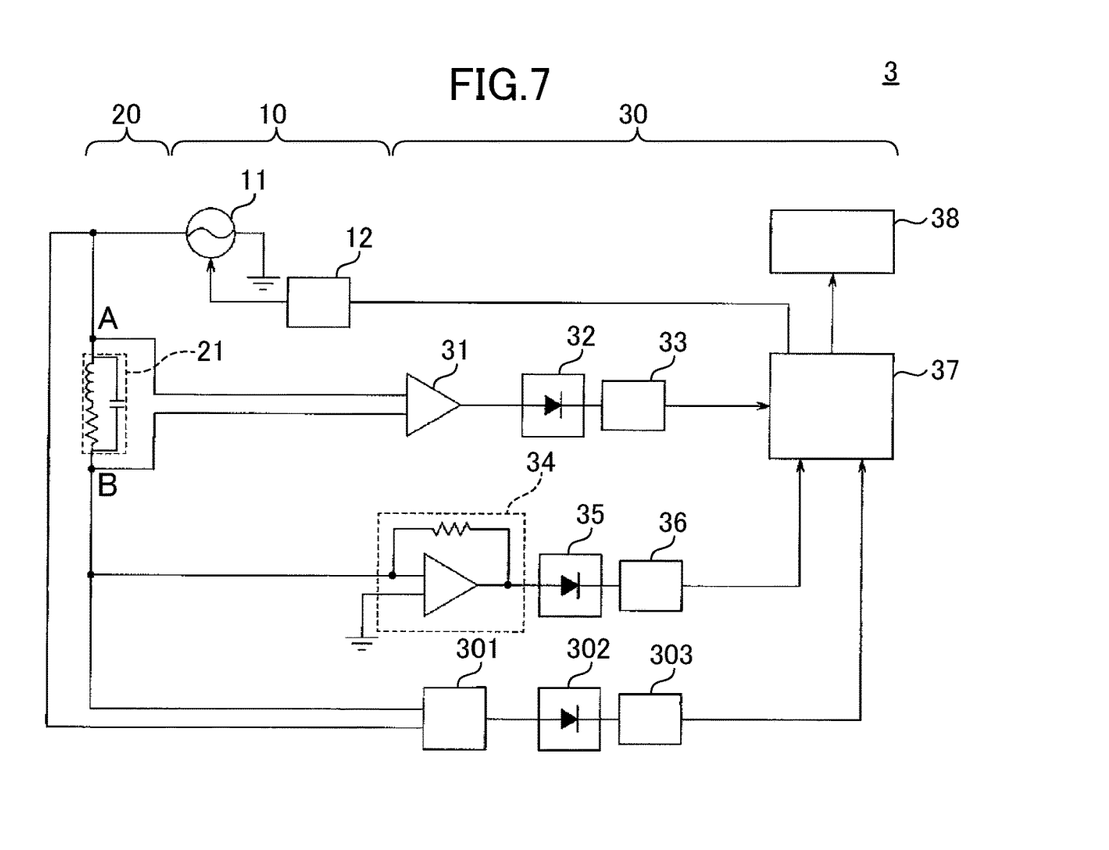
FIG. 7 is a circuit diagram for illustrating another embodiment (modification 2) of the present invention.

FIG. 7 shows a surface characteristics evaluation apparatus 3 according to another embodiment. The surface characteristics evaluation apparatus 3 according to this embodiment differs from the surface characteristics evaluation apparatus 1 (see FIG. 1) according to the embodiment described first in that the measuring instrument 30 additionally includes a phase detection circuit 301, an absolute value circuit 302 and an LPF 303. The oscillator 10 and the detector 20 are configured in the same way as those in the embodiment described first, so that descriptions thereof will be omitted, and the following description will be focused on the additional components of the measuring instrument 30.

The phase detection circuit 301 is connected to the AC power supply 11 and one end (point B) of the coil 21. A signal indicating the phase difference between the current flowing through the coil 21 and the voltage applied by the AC power supply 11 is output from the phase detection circuit 301, full-wave rectified by the absolute value circuit 302, and then converted into a direct-current signal by the LPF 303. The converted signal is input to the control means 37. That is, a voltage signal proportional to the phase difference between the voltage applied to the coil 21 and the current having passed through the coil 21 is input to the control means 37.

Figure 3:
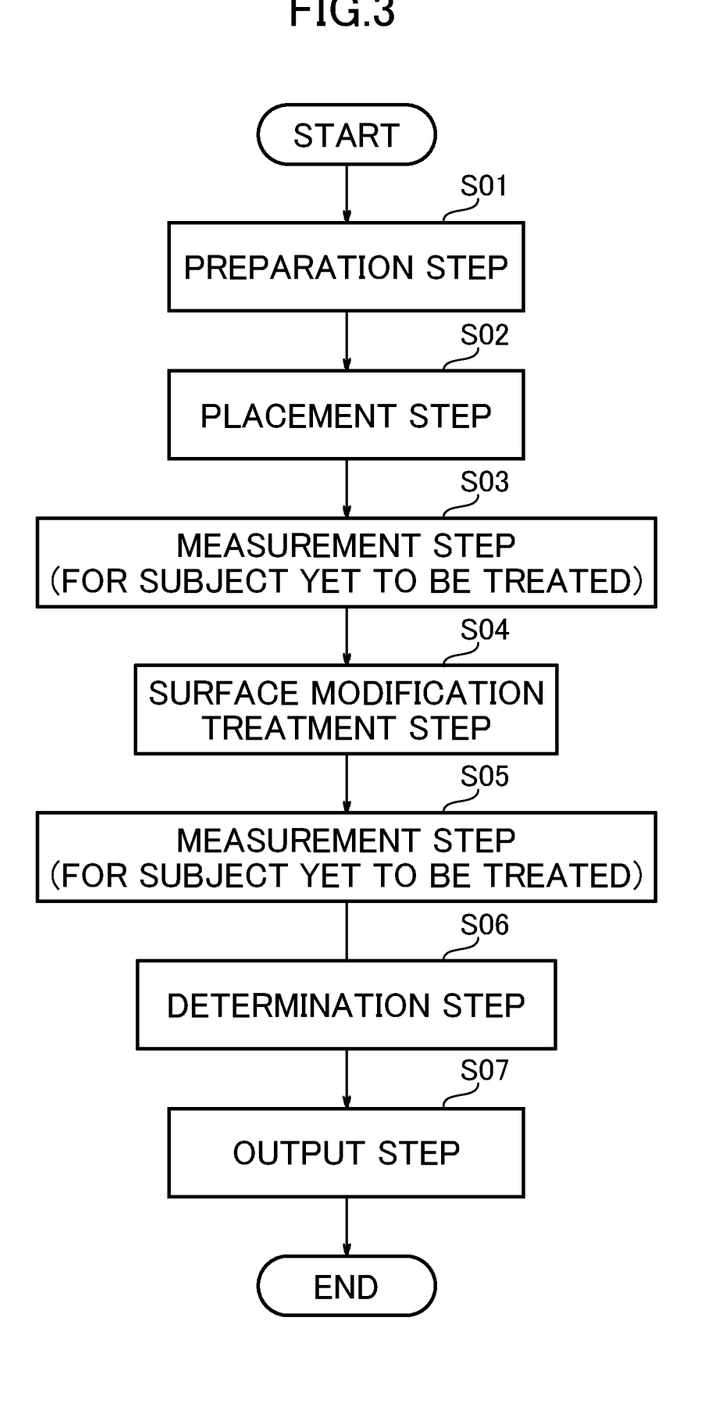
FIG. 3 is a flowchart for illustrating a surface characteristics evaluation method according to the embodiment of the present invention.

In the measurement step S03 (see FIG. 3), the control means 37 calculates the impedance $Z_0$ for the subject yet to be treated. In addition, from the signal received from the LPF 303, the control means 37 calculates a phase difference $\alpha_0$ for the subject yet to be treated. From the calculated impedance $Z_0$ and phase difference $\alpha_0$, the control means 37 calculates an inductive reactance $X_0$ for different frequencies according to a formula $X_0=Z_0\times\sin\alpha_0$. In addition, in the measurement step S05 (see FIG. 3), the control means 37 calculates the impedance $Z_1$ and a phase difference $\alpha_1$ for the surface-modified subject in the same manner as described above, and calculates an inductive reactance $X_1$ for the different frequencies.

In the determination step S06 (see FIG. 3), the control means 37 computes the ratio $(X_1/X_0)$ of the inductive reactance $X_1$ (for the surface-modified subject) to the inductive reactance $X_0$ (for the subject yet to be treated) described above for the different frequencies. By using the inductive reactance ratio for evaluation of the surface characteristics, the magnetic permeability of the subject can be selectively evaluated. Although the inductive reactance assumes a smaller value than the impedance does, the inductive reactance is superior to the impedance in sensitivity to a variation of the electric characteristics. When highly precise evaluation is needed, in particular, evaluation can be made with high precision by using the inductive reactance ratio.

The inductive reactance may be calculated by an analog signal processing as in this embodiment, or may be calculated by a digital signal processing by the control means 37 in the circuit shown in FIG. 6. In the latter case, a digital computation equivalent to the phase detection circuit 301, the absolute value circuit 302 and the LPF 303 in the circuit shown in FIG. 7 is performed in the control means 37, and the inductive reactance ($X_0$, $X_1$) is computed based on the determined phase difference ($\alpha_0$, $\alpha_1$). More specifically, the control means 37 performs the following computations a) to c).

a) The control means 37 calculates the phase difference ($\alpha_0$, $\alpha_1$) between the digital signal A/D-converted from the voltage between the opposite ends of the coil by the A/D conversion circuit 39a and the digital signal A/D-converted from the current flowing through the coil by the A/D conversion circuit 39b.

b) The control means 37 calculates the impedance ($Z_0$, $Z_1$) from the digital signal received via the A/D conversion circuit 39a, 39b according to the computation described above with reference to FIG. 6.

c) The control means 37 calculates the inductive reactance ($X_0$, $X_1$) by using the phase differences and impedances calculated in the calculations a) and b) described above.

INDUSTRIAL APPLICABILITY

In the embodiment described first, evaluation of the degree of the shot peening treatment performed on a carburized steel material has been described. However, the surface characteristics evaluation apparatus and the surface characteristics evaluation method according to the present invention can also be applied to evaluation of a steel material subjected to various heat treatments as the surface modification treatment. Furthermore, the surface characteristics evaluation apparatus and the surface characteristics evaluation method according to the present invention can also be applied to evaluation of a steel material subjected to only the shot peening treatment.

What is claimed is:

1. A surface characteristics evaluation method of evaluating a residual stress in a subject made of a steel material subjected to a surface modification treatment, comprising:
    a preparation step of preparing a surface characteristics evaluation apparatus, wherein the surface characteristics evaluation apparatus comprises
    an oscillator including an AC power supply and a frequency changing circuit,
    a detector including a coil connected to the oscillator, an amplifier amplifying a potential difference between opposite ends of the coil, a first absolute value circuit connected to the amplifier, an I/V conversion circuit connected to one end of the coil and a second absolute value circuit connected to the I/V conversion circuit, and
    a measuring instrument connected to the frequency changing circuit and the first and second absolute value circuits of the detector;
    a subject placement step of placing the subject in such a manner that an alternating magnetic field induced by the coil permeates into the subject;
    an eddy current generation step of generating an eddy current in the subject by activating the AC power supply to make the coil induce the alternating magnetic field and allowing the alternating magnetic field to permeate into the subject;
    a frequency change step of successively changing the frequency of the alternating current by the frequency changing circuit, thereby successively changing a depth of permeation of the alternating magnetic field into the subject;
    an impedance calculation step of calculating a magnitude of impedance $Z_1$ for each of different frequencies by detecting a signal representing a potential difference outputted from the first absolute value circuit and a signal representing a value of a current flowing through the coil from the second absolute value circuit;
    a reference impedance measurement step of preliminary measuring a magnitude of reference impedance $Z_0$ at each of different frequencies for a subject yet to be subjected to the surface modification treatment; and
    an evaluation step of evaluating the residual stress in the subject based on the magnitude of the impedance $Z_1$,
    wherein in the evaluation step, impedance ratios between the magnitude of the reference impedance $Z_0$ and the magnitude of the impedance $Z_1$ are computed for each of the different frequencies, and the residual stress in the subject subjected to the surface modification treatment is evaluated based on the impedance ratios.

2. The surface characteristics evaluation method according to claim 1, wherein in the evaluation step, the frequency of the alternating current is converted into the depth of permeation of the alternating magnetic field according to the following equation, and the distribution of the residual stress in the subject subjected to the surface modification treatment in the depth direction is evaluated based on the converted depth of permeation:

$$y = \kappa \frac{1}{\sqrt{\pi x \mu \sigma}}$$

where
y: depth of permeation of alternating magnetic field (μm),
k: correction coefficient,
x: frequency of alternating current (Hz),
μ: magnetic permeability of subject (H/m), and
σ: electric conductivity of subject (S/m).

3. The surface characteristics evaluation method according to claim 1, wherein in the evaluation step, a set of the impedance ratios is plotted on a coordinate system whose coordinate axes indicate the impedance ratios between the reference magnitude of the impedance $Z_0$ and the magnitude of the impedance $Z_1$ and the frequency, respectively.

4. The surface characteristics evaluation method according to claim 3, wherein in the evaluation step, the residual stress in the subject subjected to the surface modification treatment is evaluated based on a trajectory of a graph of the set of the impedance ratios plotted on the coordinate system and one or more of the impedance ratios including an extreme of the trajectory.

5. The surface characteristics evaluation method according to claim 4, wherein in the evaluation step, the quality of the surface modification treatment is determined by comparing one or more of the impedance ratios including the extreme with one or more preset thresholds.

* * * * *